(12) United States Patent
Chandramouli et al.

(10) Patent No.: US 10,694,404 B2
(45) Date of Patent: Jun. 23, 2020

(54) ISOLATED E-UTRAN OPERATION

(71) Applicant: NOKIA SOLUTIONS AND NETWORKS OY, Espoo (FI)

(72) Inventors: Devaki Chandramouli, Plano, TX (US); Rainer Liebhart, Munich (DE)

(73) Assignee: NOKIA SOLUTIONS AND NETWORKS OY, Espoo (FI)

(*) Notice: Subject to any disclaimer, the term of this patent is extended or adjusted under 35 U.S.C. 154(b) by 0 days.

(21) Appl. No.: 15/542,709

(22) PCT Filed: Jan. 13, 2015

(86) PCT No.: PCT/US2015/011180
§ 371 (c)(1),
(2) Date: Jul. 11, 2017

(87) PCT Pub. No.: WO2016/114762
PCT Pub. Date: Jul. 21, 2016

(65) Prior Publication Data
US 2018/0007571 A1    Jan. 4, 2018

(51) Int. Cl.
*H04W 24/04* (2009.01)
*H04W 48/12* (2009.01)
(Continued)

(52) U.S. Cl.
CPC ........... *H04W 24/04* (2013.01); *H04W 48/12* (2013.01); *H04W 24/08* (2013.01); *H04W 76/34* (2018.02)

(58) Field of Classification Search
CPC ..... H04W 24/04; H04W 48/12; H04W 76/34; H04W 24/08
See application file for complete search history.

(56) References Cited

U.S. PATENT DOCUMENTS

2009/0111456 A1    4/2009   Shaffer et al.
2010/0035588 A1    2/2010   Adler et al.
(Continued)

FOREIGN PATENT DOCUMENTS

WO    WO 2012/126634 A1    9/2012

OTHER PUBLICATIONS

International Preliminary Report on Patentability and Written Opinion International Application No. PCT/US2015/011180 dated Jul. 27, 2017.
(Continued)

*Primary Examiner* — Thai Nguyen
(74) *Attorney, Agent, or Firm* — Squire Patton Boggs (US) LLP (57) ABSTRACT

It is provided a method, comprising providing a first and a second service to a first a second user by a providing unit; monitoring if the providing unit operates in an isolated mode or in a linked mode; and at least one of a service controlling and a user controlling, wherein the service controlling comprises inhibiting, in the isolated mode, the providing unit from providing the second service to the first and the second user; and preventing that the providing unit is inhibited from providing the first service to at least one user; and the user controlling comprises inhibiting, in the isolated mode, the providing unit from providing the first and the second service to the second user; and preventing that the providing unit is inhibited from providing at least one service to the first user.

14 Claims, 9 Drawing Sheets

(51) Int. Cl.
*H04W 76/34* (2018.01)
*H04W 24/08* (2009.01)

(56) References Cited

U.S. PATENT DOCUMENTS

| | | | |
|---|---|---|---|
| 2012/0076000 A1 | 3/2012 | Pison | |
| 2012/0265867 A1 | 10/2012 | Boucher et al. | |
| 2013/0157655 A1 | 6/2013 | Smith et al. | |
| 2014/0112194 A1 | 4/2014 | Novlan et al. | |
| 2014/0269482 A1 | 9/2014 | Pandey et al. | |
| 2017/0078947 A1* | 3/2017 | Lee | H04W 4/90 |
| 2017/0318613 A1* | 11/2017 | Kuge | H04W 24/04 |

OTHER PUBLICATIONS

Supplementary European Search Report dated Jul. 24, 2018 corresponding to European Patent Application No. 15878204.5.
3GPP TR 22.897 V13.0.0 (Jun. 2014), Technical Report, 3rd Generation Partnership Project; Technical Specification Group Services and System Aspects; Study on Isolated Evolved Universal Terrestrial Radio Access Network (E-UTRAN) Operation for Public Safety (Release 13), 3GPP Standard; Jun. 27, 2014, pp. 1-24, XP051293387.
3GPP TS 22.346 V13.0.0 (Sep. 2014), Technical Specification, 3rd Generation Partnership Project; Technical Specification Group Services and System Aspects; Isolated Evolved Universal Terrestrial Radio Access Network (E-UTRAN) operation for public safety; Stage 1 (Release 13), 3GPP Standard; Sep. 26, 2014, pp. 1-13, XP050925956.
Qualcomm Incorporated, "IOPS Way Forward," 3GPP Draft; S2-144001; SA WG2 Meeting #106, San Francisco, USA, Nov. 17, 2014, XP050881162.
International Search Report & Written Opinion dated Jun. 4, 2015 corresponding to International Patent Application No. PCT/US2015/011180.
3GPP TR 23.713 V0.3.0 (Nov. 2014), Technical Report, 3rd Generation Partnership Project; Technical Specification Group Services and System Aspects; Study on extended architecture support for Proximity-based services (Release 13), Nov. 2014, 40 pages.
3GPP TS 23A01 V13.1.0 (Dec. 2014), Technical Specification, 3rd Generation Partnership Project; Technical Specification Group Services and System Aspects; General Packet Radio Service (GPRS) enhancements for Evolved Universal Terrestrial Radio Access Network (E-UTRAN) access (Release 13), Dec. 2014, 310 pages.
3GPP TS 23.468 V123.0 (Dec. 2014), Technical Specification, 3rd Generation Partnership Project; Technical Specification Group Services and System Aspects; Group Communication System Enablers for LTE (GCSE_LTE); Stage 2 (Release 12), Dec. 2014, 26 pages.
3GPP TS 36.331 V12.4.1 (Dec. 2014), Technical Specification, 3rd Generation Partnership Project; Technical Specification Group Radio Access Network; Evolved Universal Terrestrial Radio Access (E-UTRA); Radio Resource control (RRC); Protocol specification (Release 12), Dec. 2014, 410 pages.
European Office Action corresponding to EP Appln. No. 15 878 204.5, dated Oct. 16, 2019.

* cited by examiner

ISOLATED E-UTRAN OPERATION

FIELD OF THE INVENTION

The present invention relates to an apparatus, a method, and a computer program product related to mobile communication. More particularly, the present invention relates to an apparatus, a method, and a computer program product related to isolated operation of a radio network such as E-UTRAN.

BACKGROUND OF THE INVENTION

Abbreviations

3GPP 3rd Generation Partnership Project
App Application
AS Application Server
BSC Base Station Controller
CN Core Network
EDGE Enhanced Datarate for GSM Evolution
eNB evolved NodeB
EPC Evolved Packet Core
EPS Evolved Packet System
E-UTRAN Evolved UTRAN
GERAN GSM EDGE Radio Access Network
GCS Group Communication Service
GCSE Group Communication Service Enabler
GGSN Gateway GPRS Support Node
GPRS Generic Packet Radio Service
GSM Global System for Mobile Communication
GTP GPRS Tunneling Protocol
HLR Home Location Register
HPLMN Home PLMN
HSS Home Subscriber Server
ID Identifier
IOPS Isolated (E-UTRAN) Operation for Public Safety
LA Liquid Applications
LTE Long Term Evolution
LTE-A LTE Advanced
MCE Multicell Coordination Entity
MEC Mobile Edge Computing
MME Mobility Management Entity
NAS Non-Access Stratum
NB NodeB
NE Network Element
NeNB Nomadic eNB
OTA Over the Air
P.25 Project 25
PCRF Policy and Charging Rules Function
PDN Packet Data Network
PDN GW PDN Gateway
PGW PDN Gateway
PLMN Public Land Mobile Network
ProSe Proximity Services
QoS Quality of Service
RAN Radio Access Network
RRC Radio Resource Control
SAE Service Architecture Evolution
SCTP Stream Control Transmission Protocol
SGW Serving Gateway
SGSN Serving GPRS Support Node
SIB System Information Block
TETRA Terrestrial Trunked Radio
TS Technical Specification
UE User Equipment
UMTS Universal Mobile Telecommunications System
UTRAN UMTS Terrestrial Radio Access Network
WiFi Wireless Fidelity
WLAN Wireless Local Area Network EPS is the Evolved Packet System, the successor of GPRS (General Packet Radio System). It provides new radio interfaces and new packet core network functions for broadband wireless data access. Such EPS core network functions are the Mobility Management Entity (MME), Packet Data Network Gateway (PDN GW or PGW) and Serving Gateway (SGW).

Figure 1:
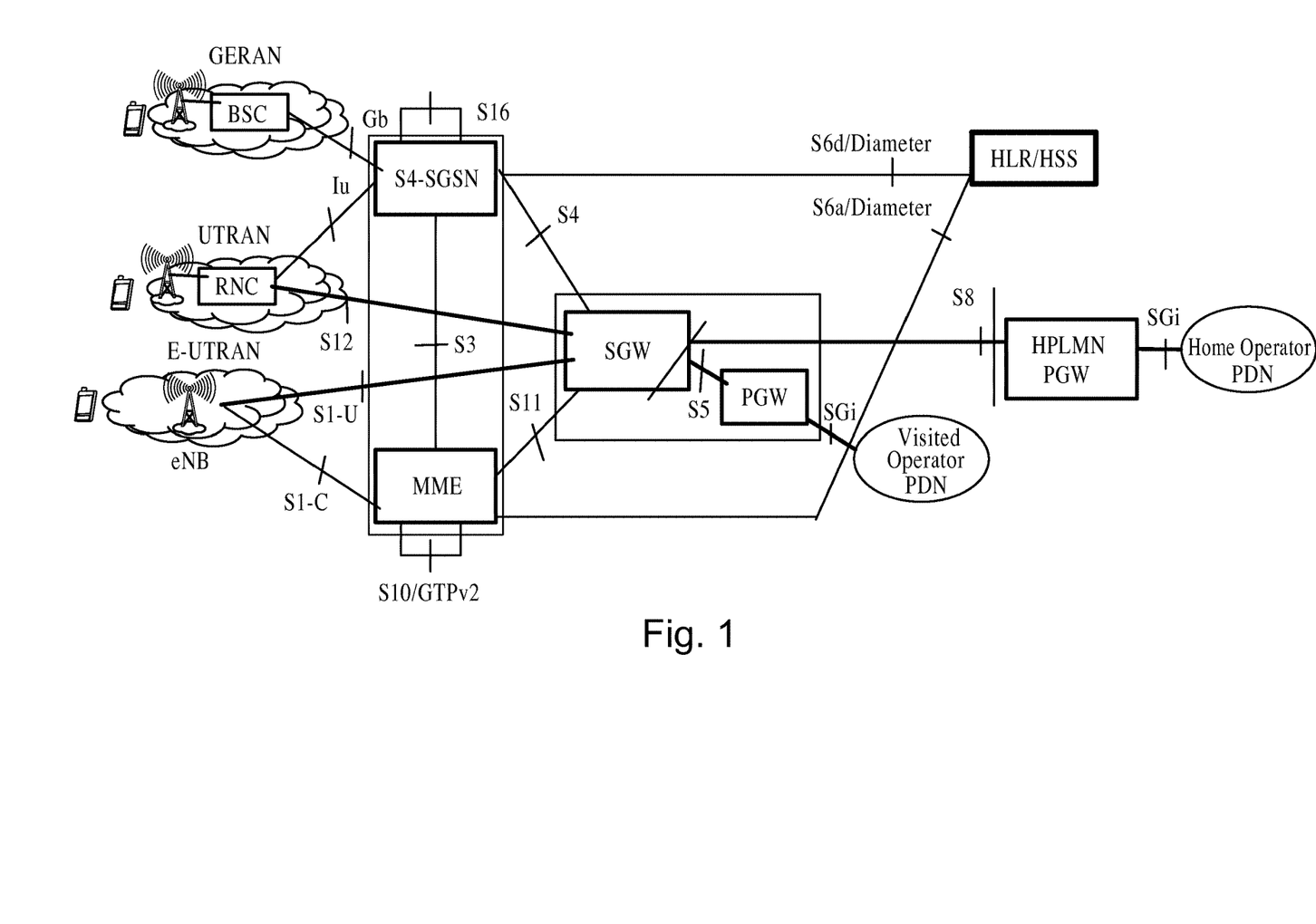
FIG. 1 shows a EPC architecture (taken from 3GPP TS 23.401)

FIG. 1 depicts an EPC architecture (taken from 3GPP TS 23.401) comprising MME, SGW and PGW. Connected to the EPC are registers such as HLR, HSS and a HPLMN in case of roaming. On the access side, EPC may be connected to E-UTRAN and UTRAN. Via a SGSN, EPC may be connected to GERAN, too. Names of the interfaces are indicated in the figure.

As may be seen from FIG. 1, a common packet domain Core Network is used for both Radio Access Networks (RAN) the GERAN and the (E-)UTRAN. This common Core Network provides GPRS services.

In order to support mission critical services, 3GPP has identified the need to support isolated E-UTRAN operation mode (IOPS). The following are the main requirements that have been identified:

IOPS provides the means to operate an E-UTRAN (which means a part of the radio access network) without or with limited backhaul connection to the core, e.g. if backhaul is affected due to disasters.

It should also be possible to create a local serving radio access network without backhaul connections, by deploying one or more additional so-called Nomadic eNBs (NeNBs) working in a standalone mode.

In addition, the IOPS feature also aims to address a scenario where a fixed or nomadic set of eNBs is without normal backhaul communications but has been provided with an alternative (non-ideal) limited bandwidth backhaul e.g. only able to transmit low-bandwidth signaling traffic to the Core Network (CN), but very little or no user plane traffic.

The Isolated E-UTRAN may comprise of a single or multiple eNBs, a single or multiple NeNBs, or a mixed group of eNBs and NeNBs and supports services for local operation.

An Isolated E-UTRAN may be created:
Following an event isolating the E-UTRAN from normal connectivity with the EPC.
Following deployment of standalone E-UTRAN NeNBs.
Isolated E-UTRAN may comprise:
Operation with no connection to the EPC.
One or multiple eNBs.
Interconnection between eNBs.
Limited backhaul capability to the EPC.
The services required to support local operation, e.g. Group Communication.

Current LTE/SAE architecture and procedures are well suited only for fully operational backhaul. This implies that the UE cannot successfully register with the network, if the backhaul has completely failed and/or is only partially available. If no user plane connectivity is available, conventionally EPS cannot provide any services to the end user.

SUMMARY OF THE INVENTION

It is an object of the present invention to improve the prior art.

According to a first aspect of the invention, there is provided an apparatus, comprising providing means adapted to provide each of a first service and a second service to each of a first user and a second user; mode monitoring means adapted to monitor if the providing means operates in an isolated mode or in a linked mode opposite to the isolated mode; and at least one of a service control means and a user control means, wherein the service control means comprises a service inhibiting means adapted to inhibit, if the providing means operates in the isolated mode, the providing means from providing the second service to the first user and the second user; and a service maintaining means adapted to prevent the service inhibiting means from inhibiting the providing means from providing the first service to at least one of the first user and the second user; and the user control means comprises a user inhibiting means adapted to inhibit, if the providing means operates in the isolated mode, the providing means from providing the first service and the second service to the second user; and a user maintaining means adapted to prevent the user inhibiting means from inhibiting the providing means from providing at least one of the first service and the second service to the first user.

The apparatus may further comprise link monitoring means adapted to monitor if a link from the providing means to a core network is available with at least a predefined quality; mode setting means adapted to set the providing means in the isolated mode if the link is not available with at least the predefined quality.

The link monitoring means may be adapted to monitor continuously if the link is available with at least the predefined quality; and the mode setting means may be further adapted to set the providing means in the linked mode if the link is available with at least the predefined quality.

The providing means may be adapted to provide the first service to the first user without interruption if the mode setting means sets the providing means from the isolated mode into the linked mode.

The apparatus may further comprise informing means adapted to inform at least one of a base station device different from the apparatus, a third user, and a mobile edge computing device that the providing means operates in the isolated mode and/or that the providing means operates in the linked mode.

The informing means may be adapted to inform the third user by broadcasting an isolated mode notification.

The first service may be at least one of a group communication service and a proximity service.

The apparatus comprising the service control means may further comprise service determining means adapted to determine the first service based on a received service determination message.

The apparatus may further comprise first handover monitoring means adapted to monitor if one of the first user and the second user is handed over to a first base station device different from the apparatus; service information forwarding means adapted to forward a service indication based on the service determination message to the first base station device.

The apparatus comprising the user control means may further comprise user determining means adapted to determine the first user based on a received user determination message.

The apparatus may further comprise second handover monitoring means adapted to monitor if one of the first user and the second user is handed over to a second base station device different from the apparatus; user information forwarding means adapted to forward a user indication based on the user determination message to the second base station device.

The apparatus may be comprised in a base station apparatus.

According to a second aspect of the invention, there is provided requesting means adapted to request a service from a base station device; checking means adapted to check if an isolated mode information is received, wherein the isolated mode information indicates that the base station device operates in an isolated mode; inhibiting means adapted to inhibit the requesting means from requesting the service if the isolated mode information is received.

According to a third aspect of the invention, there is provided monitoring means adapted to monitor if the apparatus registers at a core network; informing means adapted to inform the core network on a preference and/or a capability for isolated mode operation during the registration.

According to a fourth aspect of the invention, there is provided an apparatus, comprising configuration providing means adapted to provide, to a base station, at least one of a service indication, information about the service, and a user indication, wherein the service indication indicates a first service to be provided by the base station in an isolated mode, and the user indication indicates a user and/or a class of users to be provided with a second service by the base station in the isolated mode.

The apparatus may further comprise link monitoring means adapted to monitor if a link between the apparatus and the base station is available with at least a predefined quality; inhibiting means adapted to inhibit the configuration providing means from providing the at least one of the service indication and the user indication if the link is not available with the predefined quality.

According to a fifth aspect of the invention, there is provided an apparatus, comprising informing means adapted to inform a base station on a policy for a terminal if the base station operates in an isolated mode, wherein the policy is based on an information on at least one of a preference and a capability received from the terminal with respect to the isolated mode operation.

According to a sixth aspect of the invention, there is provided an apparatus, comprising edge computing means adapted to provide a service of a core network functionality for a base station; monitoring means adapted to monitor if a linkage information is received that the base station is turned from an isolated mode to a linked mode opposite to the isolated mode; forwarding means adapted to forward the service to a core network device different from the apparatus if the linkage information is received.

According to a seventh aspect of the invention, there is provided an apparatus, comprising providing circuitry configured to provide each of a first service and a second service to each of a first user and a second user; mode monitoring circuitry configured to monitor if the providing circuitry operates in an isolated mode or in a linked mode opposite to the isolated mode; and at least one of a service control circuitry and a user control circuitry, wherein the service control circuitry comprises a service inhibiting circuitry configured to inhibit, if the providing circuitry operates in the isolated mode, the providing circuitry from providing the second service to the first user and the second user; and a service maintaining circuitry configured to prevent the service inhibiting circuitry from inhibiting the providing circuitry from providing the first service to at least one of the first user and the second user; and the user control circuitry comprises a user inhibiting circuitry configured to inhibit, if the providing circuitry operates in the isolated mode, the providing circuitry from providing the first service and the second service to the second user; and a user maintaining circuitry configured to prevent the user inhibiting circuitry from inhibiting the providing circuitry from providing at least one of the first service and the second service to the first user.

The apparatus may further comprise link monitoring circuitry configured to monitor if a link from the providing circuitry to a core network is available with at least a predefined quality; mode setting circuitry configured to set the providing circuitry in the isolated mode if the link is not available with at least the predefined quality.

The link monitoring circuitry may be configured to monitor continuously if the link is available with at least the predefined quality; and the mode setting circuitry may be further configured to set the providing circuitry in the linked mode if the link is available with at least the predefined quality.

The providing circuitry may be configured to provide the first service to the first user without interruption if the mode setting circuitry sets the providing circuitry from the isolated mode into the linked mode.

The apparatus may further comprise informing circuitry configured to inform at least one of a base station device different from the apparatus, a third user, and a mobile edge computing device that the providing circuitry operates in the isolated mode and/or that the providing circuitry operates in the linked mode.

The informing circuitry may be configured to inform the third user by broadcasting an isolated mode notification.

The first service may be at least one of a group communication service and a proximity service.

The apparatus comprising the service control circuitry may further comprise service determining circuitry configured to determine the first service based on a received service determination message.

The apparatus may further comprise first handover monitoring circuitry configured to monitor if one of the first user and the second user is handed over to a first base station device different from the apparatus; service information forwarding circuitry configured to forward a service indication based on the service determination message to the first base station device.

The apparatus comprising the user control circuitry may further comprise user determining circuitry configured to determine the first user based on a received user determination message.

The apparatus may further comprise second handover monitoring circuitry configured to monitor if one of the first user and the second user is handed over to a second base station device different from the apparatus; user information forwarding circuitry configured to forward a user indication based on the user determination message to the second base station device.

The apparatus may be comprised in a base station apparatus.

According to an eighth aspect of the invention, there is provided requesting circuitry configured to request a service from a base station device; checking circuitry configured to check if an isolated mode information is received, wherein the isolated mode information indicates that the base station device operates in an isolated mode; inhibiting circuitry configured to inhibit the requesting circuitry from requesting the service if the isolated mode information is received.

According to a ninth aspect of the invention, there is provided monitoring circuitry configured to monitor if the apparatus registers at a core network; informing circuitry configured to inform the core network on a preference and/or a capability for isolated mode operation during the registration.

According to a tenth aspect of the invention, there is provided an apparatus, comprising configuration providing circuitry configured to provide, to a base station, at least one of a service indication, information about the service, and a user indication, wherein the service indication indicates a first service to be provided by the base station in an isolated mode, and the user indication indicates a user and/or a class of users to be provided with a second service by the base station in the isolated mode.

The apparatus may further comprise link monitoring circuitry configured to monitor if a link between the apparatus and the base station is available with at least a predefined quality; inhibiting circuitry configured to inhibit the configuration providing circuitry from providing the at least one of the service indication and the user indication if the link is not available with the predefined quality.

According to an eleventh aspect of the invention, there is provided an apparatus, comprising informing circuitry configured to inform a base station on a policy for a terminal if the base station operates in an isolated mode, wherein the policy is based on an information on at least one of a preference and a capability received from the terminal with respect to the isolated mode operation.

According to a twelfth aspect of the invention, there is provided an apparatus, comprising edge computing circuitry configured to provide a service of a core network functionality for a base station; monitoring circuitry configured to monitor if a linkage information is received that the base station is turned from an isolated mode to a linked mode opposite to the isolated mode; forwarding circuitry configured to forward the service to a core network device different from the apparatus if the linkage information is received.

According to a thirteenth aspect of the invention, there is provided a method, comprising providing each of a first service and a second service to each of a first user and a second user by a providing unit; monitoring if the providing unit operates in an isolated mode or in a linked mode opposite to the isolated mode; and at least one of a service controlling and a user controlling, wherein the service controlling comprises inhibiting, if the providing unit operates in the isolated mode, the providing unit from providing the second service to the first user and the second user; and preventing that the providing unit is inhibited from providing the first service to at least one of the first user and the second user; and the user controlling comprises inhibiting, if the providing unit operates in the isolated mode, the providing unit from providing the first service and the second service to the second user; and preventing that the providing unit is inhibited from providing at least one of the first service and the second service to the first user.

The method may further comprise monitoring if a link from the providing unit to a core network is available with at least a predefined quality; setting the providing unit in the isolated mode if the link is not available with at least the predefined quality.

The link monitoring may comprise continuously monitoring if the link is available with at least the predefined quality; and the method may further comprise setting the providing unit in the linked mode if the link is available with at least the predefined quality.

The method may further comprise providing the first service to the first user without interruption if the providing unit from the isolated mode into the linked mode.

The method may further comprise informing at least one of a base station device different from an apparatus performing the method, a third user, and a mobile edge computing device that the providing unit operates in the isolated mode and/or that the providing unit operates in the linked mode.

The third user may be informed by broadcasting an isolated mode notification.

The first service may be at least one of a group communication service and a proximity service.

The method comprising the service controlling may further comprise determining the first service based on a received service determination message.

The method may further comprise monitoring if one of the first user and the second user is handed over to a first base station device different from an apparatus performing the method; forwarding a service indication based on the service determination message to the first base station device.

The method comprising the user controlling may further comprise determining the first user based on a received user determination message.

The method may further comprise monitoring if one of the first user and the second user is handed over to a second base station device different from an apparatus performing the method; forwarding a user indication based on the user determination message to the second base station device.

The method may be performed in a base station apparatus.

According to a fourteenth aspect of the invention, there is provided a method, comprising requesting a service from a base station device; checking if an isolated mode information is received, wherein the isolated mode information indicates that the base station device operates in an isolated mode; inhibiting the requesting of the service if the isolated mode information is received.

According to a fifteenth aspect of the invention, there is provided a method, comprising monitoring if an apparatus performing the method registers at a core network; informing the core network on a preference and/or a capability for isolated mode operation during the registration.

According to a sixteenth aspect of the invention, there is provided a method, comprising providing, to a base station, at least one of a service indication, information about the service, and a user indication, wherein the service indication indicates a first service to be provided by the base station in an isolated mode, and the user indication indicates a user and/or a class of users to be provided with a second service by the base station in the isolated mode.

The method may further comprise monitoring if a link between an apparatus performing the method and the base station is available with at least a predefined quality; inhibiting the providing of the at least one of the service indication and the user indication if the link is not available with the predefined quality.

According to a seventeenth aspect of the invention, there is provided a method, comprising informing a base station on a policy for a terminal if the base station operates in an isolated mode, wherein the policy is based on an information on at least one of a preference and a capability received from the terminal with respect to the isolated mode operation.

According to an eighteenth aspect of the invention, there is provided a method, comprising providing a service of a core network functionality for a base station; monitoring if a linkage information is received that the base station is turned from an isolated mode to a linked mode opposite to the isolated mode; forwarding the service to a core network device different from an apparatus performing the method if the linkage information is received.

Each of the methods of the thirteenth to eighteenth aspects may be a method for isolated operation.

According to a nineteenth aspect of the invention, there is provided a computer program product comprising a set of instructions which, when executed on an apparatus, is configured to cause the apparatus to carry out the method according to any of the thirteenth to eighteenth aspects. The computer program product may be embodied as a computer-readable medium or directly loadable into a computer.

According to some embodiments of the invention, at least the following advantages are provided:
at least limited service may be provided to selected users even in case of limited or no backhaul connection;
enables fast set-up of a communication infrastructure in case of disasters;
no need to modify conventional UEs;
E-UTRAN may replace P.25 and TETRA, thus saving costs for infrastructure.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein.

DETAILED DESCRIPTION OF CERTAIN EMBODIMENTS

Herein below, certain embodiments of the present invention are described in detail with reference to the accompanying drawings, wherein the features of the embodiments can be freely combined with each other unless otherwise described. However, it is to be expressly understood that the description of certain embodiments is given for by way of example only, and that it is by no way intended to be understood as limiting the invention to the disclosed details.

Moreover, it is to be understood that the apparatus is configured to perform the corresponding method, although in some cases only the apparatus or only the method are described.

Figure 2:
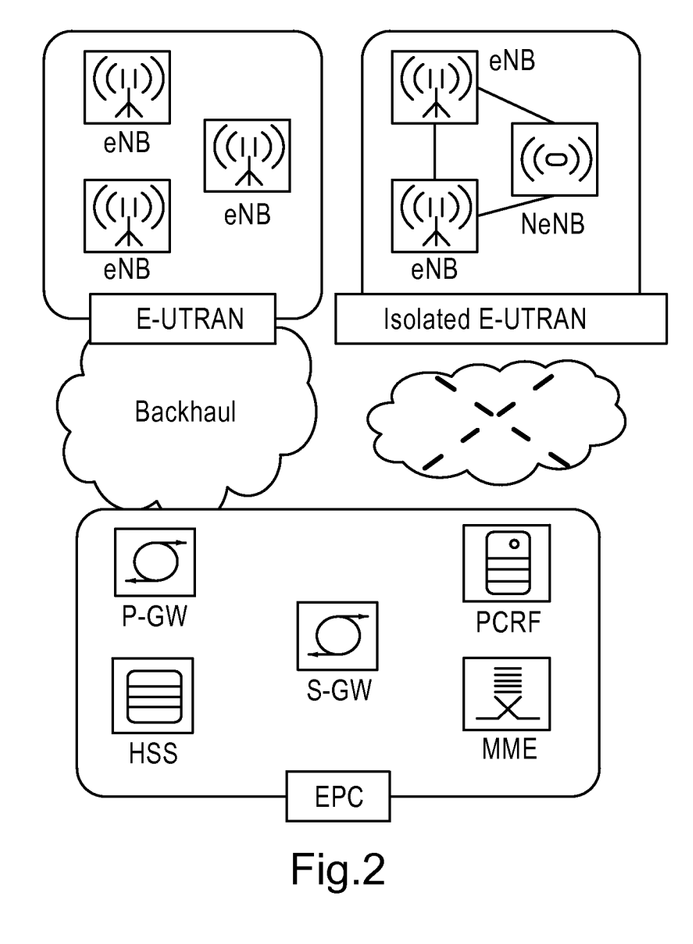
FIG. 2 shows E-UTRAN in linked mode of operation (left side) and isolated mode of operation (right side)

FIG. 2 illustrates the linked mode (left side) and isolated mode (right side) of E-UTRAN operation. The left E-UTRAN network is connected via the backhaul with EPC, as it is conventional foreseen. This mode of operation is denoted as "linked mode". The right E-UTRAN network is not connected to the EPC but isolated therefrom ("isolated mode"). The right E-UTRAN network (in isolated mode) may comprise one or more NeNB(s) in addition to the stationary eNB(s).

Some embodiments of the invention provide a solution for at least one of the following scenarios:
 a) UEs registered to the E-UTRAN network that are in the connected mode and transmitting data should be able to receive limited services, if E-UTRAN becomes isolated due to backhaul failure in the interim.
 b) UEs registered to the network but are in idle mode should be able to receive limited services when they transit to connected mode, if E-UTRAN becomes isolated due to backhaul failure in the interim.
 c) UEs newly trying to connect to the network should be able to receive limited services when they are trying to register with the network. E.g. group communication in the coverage area of the isolated E-UTRAN should be possible.

Some embodiments of the invention provide an end to end solution for Isolated E-UTRAN mode of operation. It may include one or more of the following aspects:
 1) Preparation for IOPS mode of operation
 2) Detection of backhaul failure
 3) Setup of IOPS mode of operation
 4) Procedure to offer services in IOPS mode of operation.
 5) Recovery These aspects are described in detail hereinafter.

1. Preparation for IOPS Mode of Operation:

E-UTRAN should have the knowledge about the class of users and/or group of users and/or single users who are admitted to receive services in the isolated mode. Since the network is not fully operational in the isolated mode, some users may not be served. Furthermore, only a limited number of services may be offered or services may be offered only partially (e.g. no full access to the Internet, Group Communication without full support for QoS, or limited number of supported group features). In the present application, a partially offered service may be considered as a service different from the fully offered service.

Figure 3:
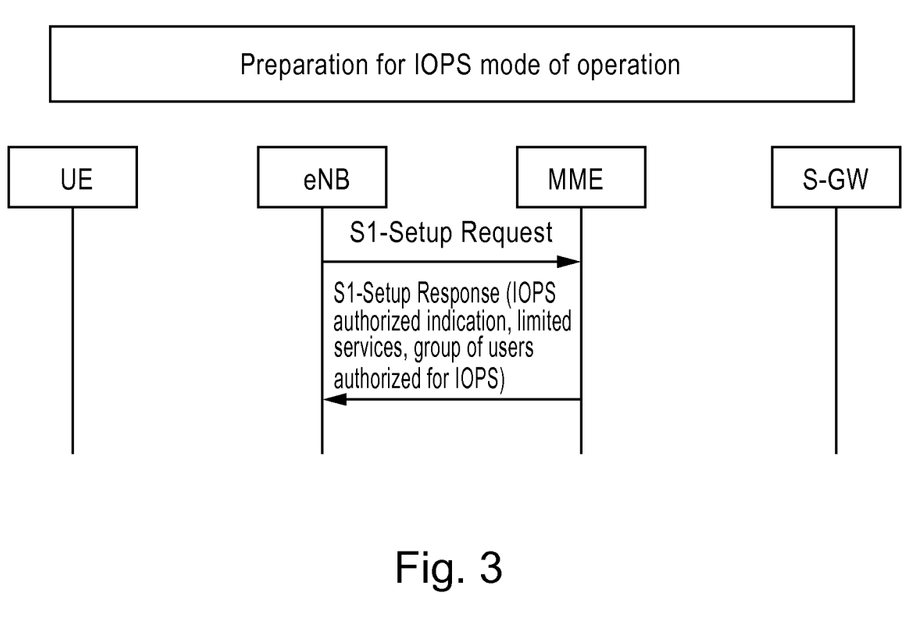
FIG. 3 shows a message flow for preparation of IOPS mode of operation (part 1)

This can be accomplished by pre-configuring IOPS information in the E-UTRAN network. Alternatively, this information may be provided to the E-UTRAN network during initial S1 Setup by the MME (if and as long as a signaling connection exists). This is shown in the call flow of FIG. 3. The settings in the E-UTRAN may be updated dynamically (e.g. by MME if a signaling connection is available, or locally at the eNB) which enables more flexibility and enables configuration based on the type of services/users in the affected area. The information related to the users may comprise either the class of users/group of users/single users admitted to receive services. Alternatively (or in addition), it may comprise the complementary information, namely the class of users/group of users/single users not admitted to receive services. Correspondingly, the information related to the services may comprise an indication of the services which are offered in the isolated mode and/or an indication of the services not offered in the isolated mode.

Figure 4:
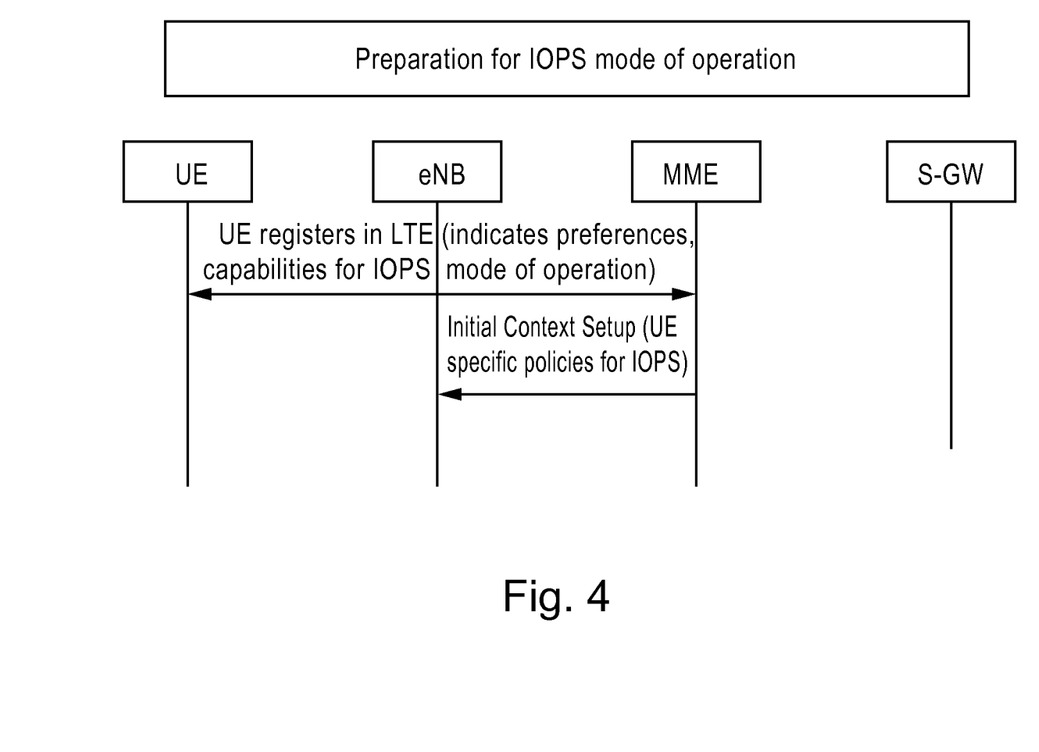
FIG. 4 shows a message flow for preparation of IOPS mode of operation (part 2)

The network may determine the type of services required for the UE in IOPS mode based on preferences and capabilities indicated by the UE. This is shown in the call flow of FIG. 4: When UE registers in the MME, it may indicate preferences and capabilities for IOPS. MME may provide additional information to the eNB in the field 'per UE policies' during "Initial Context Setup request" procedure, e.g. regarding the type of user, class of user, allowed services, ID of the Group the UE belongs to, etc. The additional information may be based on the preferences and capabilities indicated by the UE, and/or it may be based on other criteria such as a type of the UE.

2. Detection of Backhaul Failure

According to some embodiments, E-UTRAN (eNB) is able to detect isolated operation mode. Following are some ways to detect this:
 a. Unavailability of M1/S1 link towards MCE/MME respectively for control plane signalling (e.g. based on SCTP link failure).
 b. Unavailability of S1-U link towards S-GW. This can be determined by monitoring GTP "keep-alive" (Echo request/response) messages, or by monitoring if there is a lack of request messages from the S-GW or lack of response messages for a certain period of time.

Upon detection of unavailability of S1-U link (and possibly also S1-C link outage), according to some embodiments of the invention, eNB decides to operate in isolated E-UTRAN mode.

In some embodiments of the invention, eNB is preconfigured (e.g. by local administration) to operate in isolated mode. This may be useful for NeNB which is operated in case of disasters only. In such a case link availability need not be detected.

3. Setup and Notification of IOPS Mode of Operation

Whether eNB can in principle operate in this mode is determined by information provided by the core network or preconfigured in eNB. In some embodiments of the invention, the eNB also knows that it may offer only limited services and/or services only to limited set of UE(s) during the isolated mode of operation. This information was provided by the MME during the preparation phase (see step #1 above).

If X2 connections to other eNBs are available, the eNB may be aware which of these other eNBs is reachable for signalling and user plane data (as of means in step 2 above) and is IOPS capable. If one eNB goes into IOPS mode of operation, it may notify other (surrounding) eNB(s) via X2 and/or the MME via S1-C, if a signalling connection to the other eNB(s) and CN, respectively, is still available.

Upon activating the isolated mode, according to some embodiments of the invention, the eNB optionally informs the UE(s) that it is operating in IOPS mode in its serving area (or part of it), e.g. in a certain cell. According to some embodiments of the invention, such information has the following benefits:
  a. This notification can help avoid requests from some UE(s) for normal services during this period—i.e. avoid overload.
  b. This notification can help UE(s) avoid sending NAS messages (as an example)—i.e. optimize use of OTA resources.
  c. This notification can also help notify the users that not all services are available during this time.

E.g. the information may be broadcasted, e.g. in a System Information Block (SIB) message. Thus, SIBs defined in 3GPP TS 36.331 may be enhanced to include broadcasting of IOPS mode of operation to the UE(s). This indication can be a simple flag "IOPS", indicating that eNB is operating in IOPS mode, or several indications are defined indicating different levels of IOPS mode of operation, e.g. no services available, only some limited set of services available, or all services available in this IOPS area. In addition, eNBs can be configured with information to which IOPS area(s) they belong to.

Alternatively, eNB may inform the UEs on IOPS mode of operation by dedicated signalling.

A NeNB could be the newly installed Nomadic eNB in a disaster region (e.g. public safety personnel bring it in a van to the disaster region). Alternatively or in addition, when there are multiple eNBs in an area, one of the eNBs in the IOPS area may be configured to act as a Nomadic eNB. All the eNB(s) in the area will be configured with information i.e. network topology about the IOPS serving area thus they should know the radio access network configuration for IOPS mode of operation.

When eNB goes into IOPS mode of operation, UE(s) that are actively transmitting user data may notice that there is an interruption in the service when there is a backhaul failure e.g. due to lack of acknowledgement for uplink user plane packets from the application server. UE(s) that are in idle mode and UE(s) that have not registered to the network will receive notifications regarding the limited service availability.

4. IOPS Mode of Operation

During this mode of operation, E-UTRAN (eNB) may offer limited services to a special group of users. It may authorize the users based on RRC establishment cause provided by the UE (e.g. high priority indication). In general, it may have the ability to offer communication channels to other UE(s) in the IOPS area.

Typically, group communication services and Proximity services are two services that are required for public safety personnel (i.e. communicate with each other, share images, videos etc) also in case of IOPS mode of operation.

Figure 5:
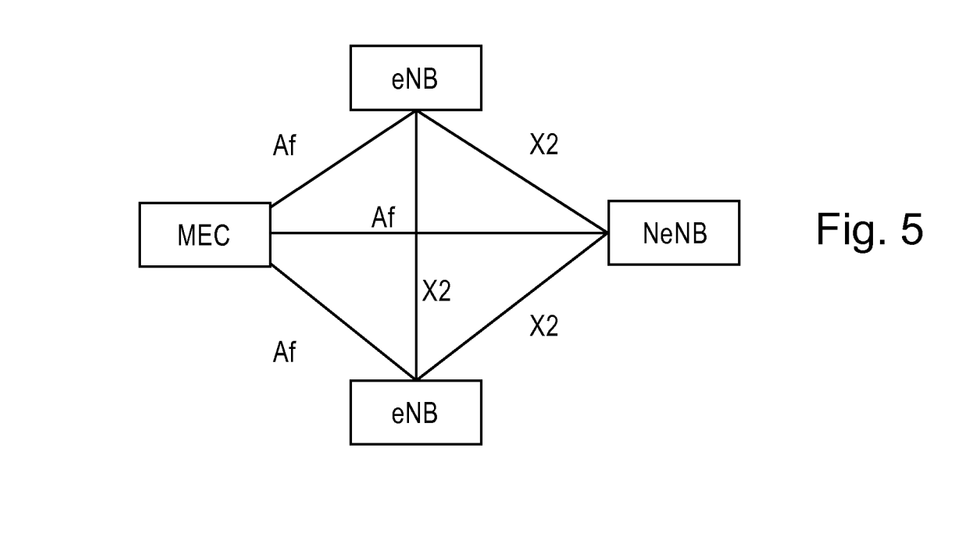
FIG. 5 shows an architecture to be used in IOPS mode of operation with MEC.

In the following, two embodiments of the invention to provide group communication and proximity services for IOPS are described in detail:

To provide group communication, deployment of a MEC (Mobile Edge Computing) server in the E-UTRAN (either centrally in E-UTRAN or collocated with the eNB). MEC is currently standardized in ETSI (at least parts of it); Nokia's implementation is called Liquid Applications (LA). It is assumed that there is a (small, i.e. with limited functionality) group application server running on the MEC platform called Group App, that can use services offered by MEC (e.g. receives radio related data or user plane packets if required). The architecture is shown in FIG. 5, according to which each of the eNB and NeNB is connected to MEC via Af interface. In addition, some or all of the eNBs and NeNBs may be connected with each other via X2 interface.

In some embodiments of the invention, group communication service can be offered to UE(s) in the area. Preferably, the Group App on MEC is in synchronization with the GCS AS (Group communication service Application Server defined in 3GPP TS 23.468 for GCSE) as long as there is network connectivity. When network connectivity is lost, Group App on MEC in the IOPS area is able to take over the role of the GCS AS. Similarly, when network connectivity is back up, then the MEC uploads information to the GCS AS to ensure synchronization (e.g. on changed group settings) and downloads latest group status from the network. Authentication and authorization of the UE can be performed by another Application running on the MEC platform. This App emulates MME and parts of HSS and is called MME App. It is used to allow connectivity for the UE. In addition, a PGW App can emulate PGW, e.g. allocate an IP address to the UE and allow access to the local IOPS PDN, e.g. allowing communication between UEs in the IOPS area. Basic information to authenticate and authorize a UE can be retrieved from the Core Network (CN) as long as eNB has connectivity to the CN (e.g. session keys). The Apps running on the MEC platform can e.g. sniff into NAS messages exchanged between UE and MME in order to be aware that the UE is authenticated and authorized (secrets, keys stored in the HSS may not be accessible to the App as there is no direct interface to the HSS). Some or all of these functions (MME/HSS/PGW and/or GCS AS) may be running on one or several separated (i.e. standalone) MEC platforms or they may be implemented in one or more of the eNB(s) and NeNB(s).

Figure 6:
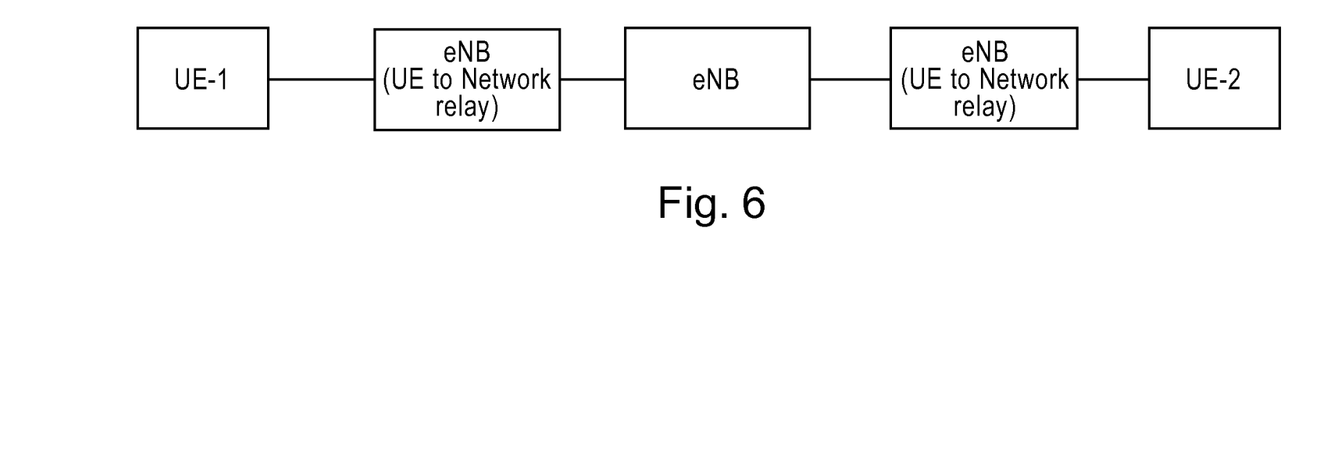
FIG. 6 shows an architecture to be used in IOPS mode of operation with eNB acting as relay.

According to some embodiments of the invention, ProSe services may be offered as follows: The eNB(s) have the ability to act as a UE to network and/or UE to UE ProSe relay (may be Layer 2 or Layer 3 relay) and support the functionalities as described in 3GPP TR 23.713 for UE to network and/or UE to UE relay thus also support the PC5 interface. In this case, UE(s) can communicate with each other in the IOPS area, extend their coverage and communication area by using one or more eNB(s) acting as UE-to-network or UE-to-UE ProSe relay. FIG. 6 shows eNBs acting as a UE-to-network relay to establish a communication channel between UE-1 and UE-2 in the IOPS area. Between the eNBs to which UE-1 and UE-2 are attached, there may be none, one, or more than one other eNBs (one is shown in FIG. 6). UE-1 and UE-2 may be attached to the same eNB.

According to some embodiments of the invention, during isolated mode of operation, eNB may simply process RRC messages while dropping all the NAS messages (or direct NAS messages to the MME App running on MEC).

5. Recovery

According to some embodiments of the invention, eNB will monitor the availability of S1-U and S1-C links continuously. When it detects link recovery, it starts the recovery operation. That is, when eNB detects that backhaul links are available again, it may change back to regular mode of operation ("linked mode") for new requests from the UEs. It should do this in a manner that it does not interrupt the limited services i.e. group communication services and proximity services that are currently ongoing. For example, the radio network may continue offering the limited services (currently being offered) in IOPs mode of operation even if it detects that the backhaul is back in operation to ensure seamless transition. On the other hand, for new service requests, the eNB should behave as in regular mode of operation. If eNB performed broadcasting to notify the UE(s) in step 3 (setup phase), it may also broadcast to the UE(s) that it is now operating in regular mode of operation to the UE(s) in this area. When the eNB detects recovery, it may notify also the MEC platform and/or the applications running on top of MEC mentioned above. Upon recovery, NAS layer and application layer messages are forwarded to the core network and GCS AS as in normal mode of operation and not to the applications running on the MEC platform.

Figure 7:
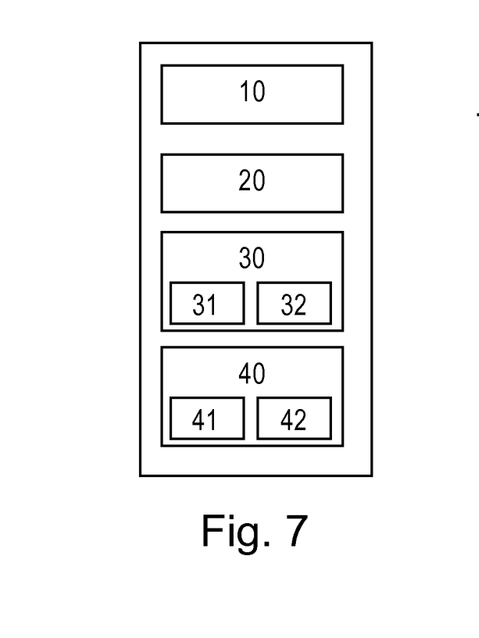
FIG. 7 shows an apparatus according to an embodiment of the invention.
Figure 8:
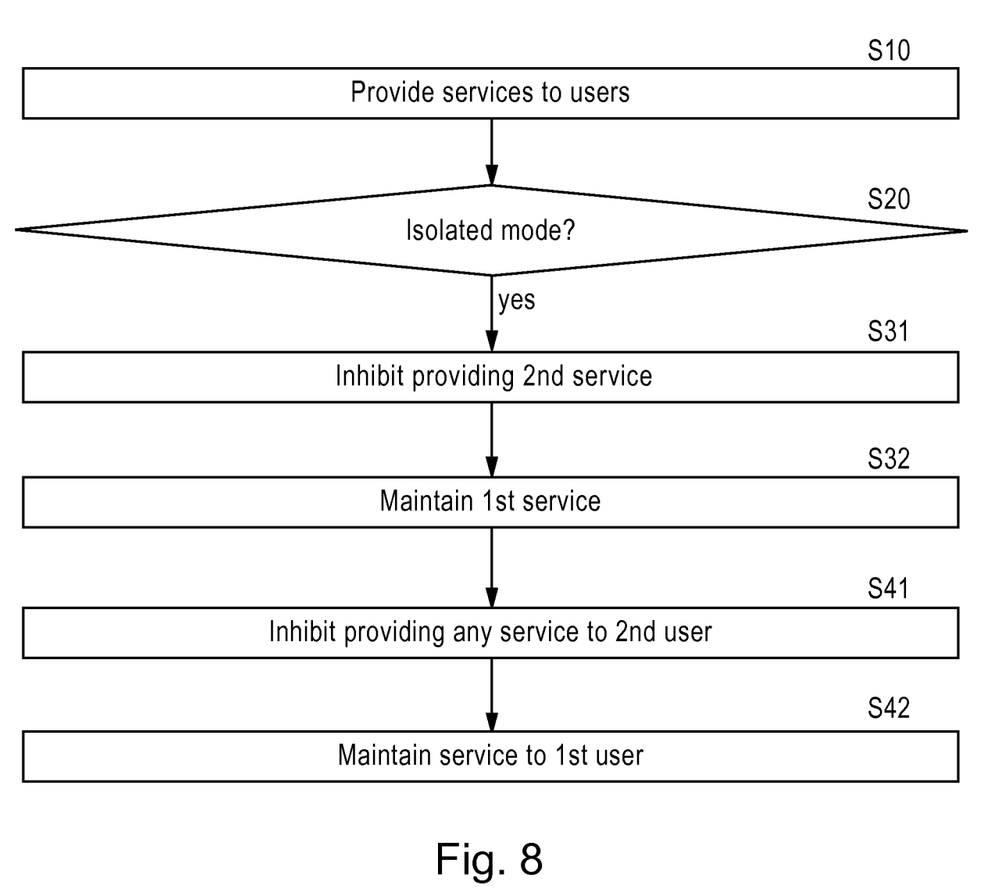
FIG. 8 shows a method according to an embodiment of the invention.

FIG. 7 shows an apparatus according to an embodiment of the invention. The apparatus may be a base station such as an eNB or an element thereof. FIG. 8 shows a method according to an embodiment of the invention. The apparatus according to FIG. 7 may perform the method of FIG. 8 but is not limited to this method. The method of FIG. 8 may be performed by the apparatus of FIG. 7 but is not limited to being performed by this apparatus.

The apparatus comprises providing means 10, mode monitoring means 20, and at least one of service control means 30 and user control means 40.

The providing means 10 provides each of a first service and a second service to each of a first user and a second user (S10). The mode monitoring means 20 monitors if the providing means 10 operates in an isolated mode or in a linked mode opposite to the isolated mode (S20).

In FIGS. 7 and 8 an apparatus and a method are shown, respectively, which comprise both a service control means 30 and a user control means 40 and the respective method steps. However, embodiments of the invention may comprise only one of the service control means 30 and user control means 40 and respective steps (S31, S32) and (S41, S42), respectively.

The service control means 30 comprises a service inhibiting means 31 which inhibits, if the providing means 10 operates in the isolated mode (S20="yes"), the providing means 10 from providing the second service to the first user and the second user (in general: to most or all users) (S31). In addition, the service control means 30 comprises a service maintaining means 32 which prevents the service inhibiting means 31 from inhibiting the providing means 10 from providing the first service to at least one of the first user and the second user (S32). Thus, the first service is maintained for at least a limited number of users. Steps S31 and S32 may be performed in parallel or in one of the sequences S31-S32 and S32-S31.

The user control means 40 comprises a user inhibiting means 41 which inhibits, if the providing means 10 operates in the isolated mode (S20="yes"), the providing means 10 from providing the first service and the second service (in general: most or all services) to the second user (S41). In addition, the user control means 40 comprises a user maintaining means 42 which prevents the user inhibiting means 41 from inhibiting the providing means 10 from providing at least one of the first service and the second service to the first user (S42). Thus, the first user is provided with at least a limited number of services. Steps S41 and S42 may be performed in parallel or in one of the sequences S41-S42 and S42-S41.

According to some embodiments of the invention comprising both service control (means) and user control (means), the sequence of steps S31, S32 related to service control may be interchanged with the sequence of steps S41, S42 of user control. The sequences of steps may be performed in parallel. Also, other sequences of steps such as S31-S41-S32-S42 are conceivable as embodiments of the invention. In general, a sequence of steps according to some embodiments of the invention may comprise any permutation of steps S31, S32, S41, and S42, whereof some or all may be performed in parallel.

The maintaining steps S32 and/or S42 may be performed only if the providing means operates in the isolated mode (S20="yes"), or one or both of them may be performed regardless of the mode of the providing means.

Figure 9:
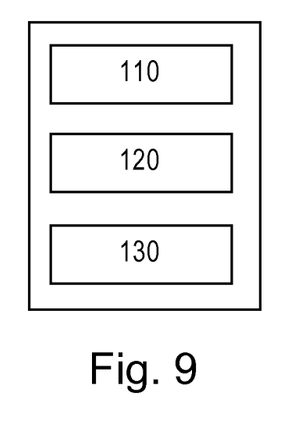
FIG. 9 shows an apparatus according to an embodiment of the invention.
Figure 10:
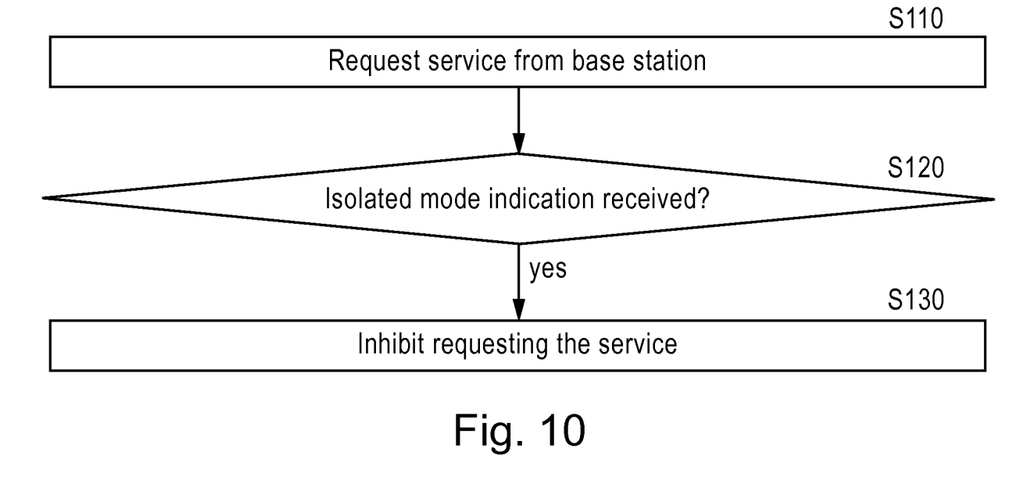
FIG. 10 shows a method according to an embodiment of the invention.

FIG. 9 shows an apparatus according to an embodiment of the invention. The apparatus may be a terminal such as a UE or an element thereof. FIG. 10 shows a method according to an embodiment of the invention. The apparatus according to FIG. 9 may perform the method of FIG. 10 but is not limited to this method. The method of FIG. 10 may be performed by the apparatus of FIG. 9 but is not limited to being performed by this apparatus.

The apparatus comprises requesting means 110, checking means 120, and inhibiting means 130.

The requesting means 110 requests a service from a base station device (S110). The checking means 120 checks if an isolated mode information is received (S120). The isolated mode information indicates that the base station device operates in an isolated mode. S110 and S120 may be performed in parallel, or in one of the sequences S110-S120 and S120-S110.

If the isolated mode information is received (S120="yes"), the inhibiting means 130 inhibits the requesting means 110 from requesting the service (S130).

Figure 11:
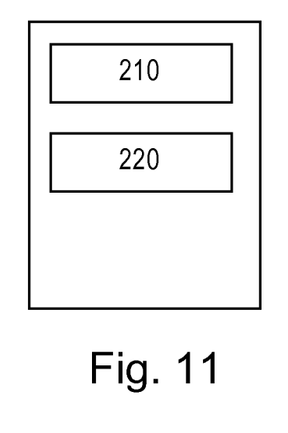
FIG. 11 shows an apparatus according to an embodiment of the invention.
Figure 12:
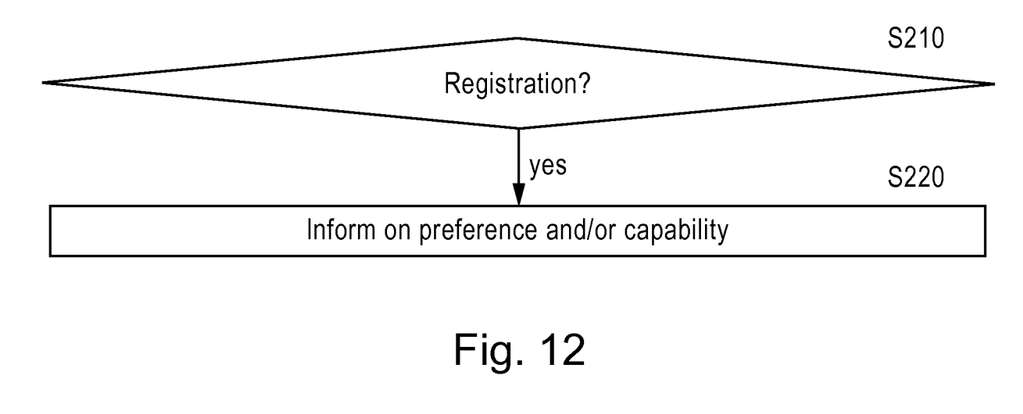
FIG. 12 shows a method according to an embodiment of the invention.

FIG. 11 shows an apparatus according to an embodiment of the invention. The apparatus may be a terminal such as a UE or an element thereof. FIG. 12 shows a method according to an embodiment of the invention. The apparatus according to FIG. 11 may perform the method of FIG. 12 but is not limited to this method. The method of FIG. 12 may be performed by the apparatus of FIG. 11 but is not limited to being performed by this apparatus.

The apparatus comprises monitoring means 210 and informing means 220.

The monitoring means 210 monitors if the apparatus registers at a core network (S210). During the registration (S210="yes"), the informing means 220 informs the core network on a preference and/or a capability for isolated mode operation (S220).

Figure 13:
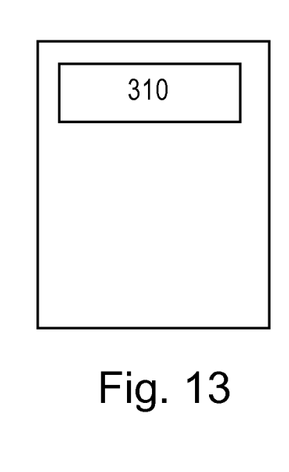
FIG. 13 shows an apparatus according to an embodiment of the invention.

FIG. 13 shows an apparatus according to an embodiment of the invention. The apparatus may be a core network element such as a MME or an element thereof.

Figure 14:
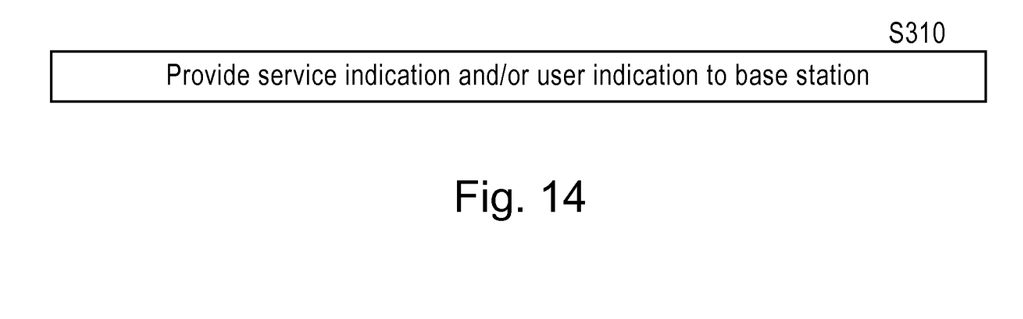
FIG. 14 shows a method according to an embodiment of the invention.

FIG. 14 shows a method according to an embodiment of the invention. The apparatus according to FIG. 13 may perform the method of FIG. 14 but is not limited to this method. The method of FIG. 14 may be performed by the apparatus of FIG. 13 but is not limited to being performed by this apparatus.

The apparatus comprises configuration providing means 310.

The configuration providing means 310 provides, to a base station, at least one of a service indication, an information about the service, and a user indication (S310). The service indication indicates a first service to be provided by the base station in an isolated mode. The user indication indicates a user and/or a class of users to be provided with a second service by the base station in the isolated mode.

Figure 15:
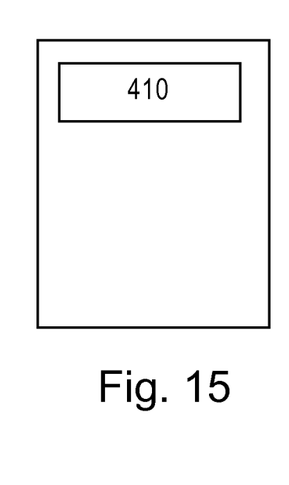
FIG. 15 shows an apparatus according to an embodiment of the invention.
Figure 16:
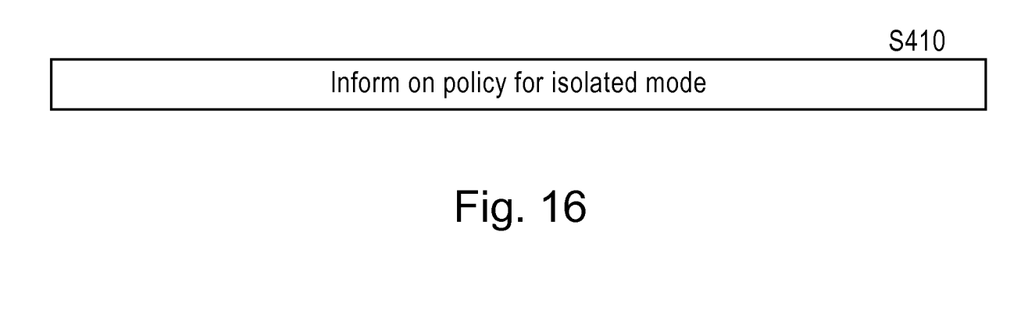
FIG. 16 shows a method according to an embodiment of the invention.

FIG. 15 shows an apparatus according to an embodiment of the invention. The apparatus may be a core network element such as a MME or an element thereof. FIG. 16 shows a method according to an embodiment of the invention. The apparatus according to FIG. 15 may perform the method of FIG. 16 but is not limited to this method. The method of FIG. 16 may be performed by the apparatus of FIG. 15 but is not limited to being performed by this apparatus.

The apparatus comprises configuration informing means 410.

The informing means 410 informs a base station on a policy to be used for a terminal if the base station operates in an isolated mode (S410). The policy is based on an information on at least one of a preference and a capability received from the terminal with respect to the isolated mode operation.

Figure 17:
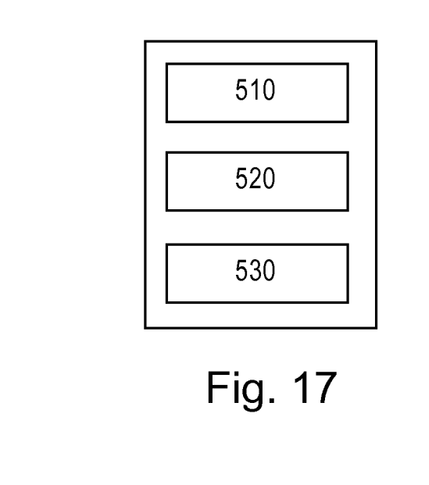
FIG. 17 shows an apparatus according to an embodiment of the invention.
Figure 18:
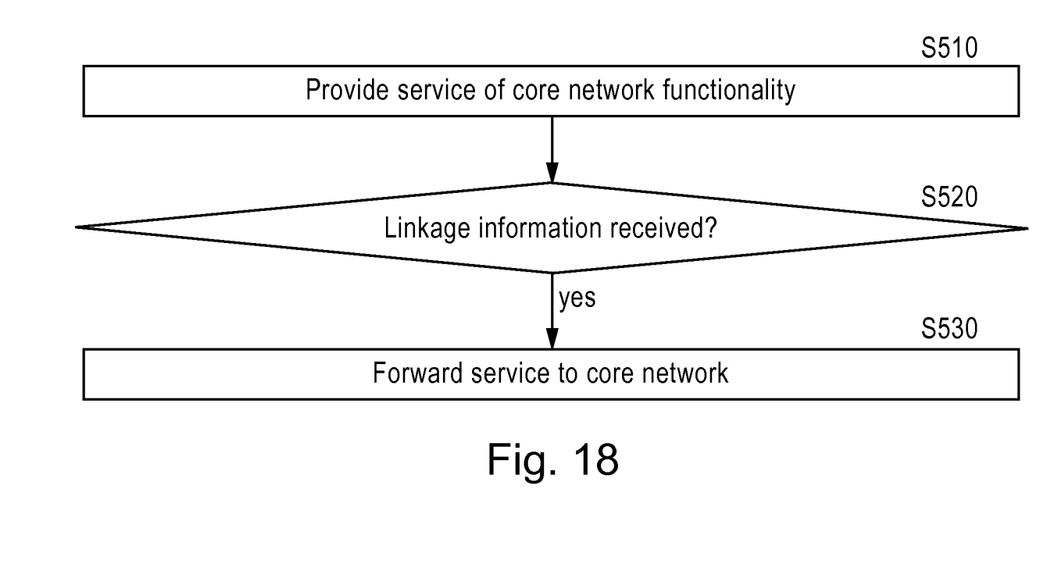
FIG. 18 shows a method according to an embodiment of the invention.

FIG. 17 shows an apparatus according to an embodiment of the invention. The apparatus may be a mobile edge computing device or an element thereof. FIG. 18 shows a method according to an embodiment of the invention. The apparatus according to FIG. 17 may perform the method of FIG. 18 but is not limited to this method. The method of FIG. 18 may be performed by the apparatus of FIG. 17 but is not limited to being performed by this apparatus.

The apparatus comprises edge computing means 510, monitoring means 520, and forwarding means 530.

The edge computing means 510 provides a service of a core network functionality for a base station (S510). The monitoring means 520 monitors if a linkage information is received (S520). The linkage information indicates that the base station is turned from an isolated mode to a linked mode opposite to the isolated mode.

If the linkage information is received (S520="yes"), the forwarding means 530 forwards the service to a core network device different from the apparatus (S530). Thus, the base station is served by the core network instead of y the apparatus such as a mobile edge computing device.

Figure 19:
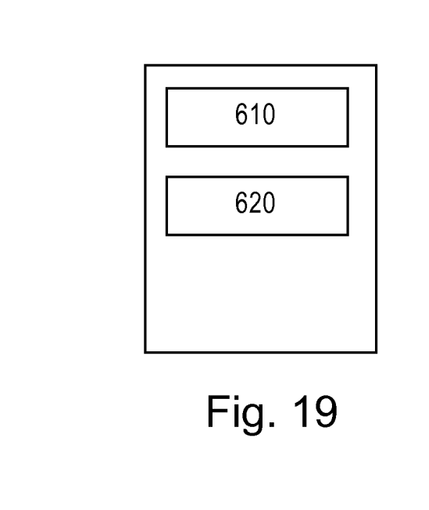
FIG. 19 shows an apparatus according to an embodiment of the invention.

FIG. 19 shows an apparatus according to an embodiment of the invention. The apparatus comprises at least one processor 610, at least one memory 620 including computer program code, and the at least one processor 610, with the at least one memory 620 and the computer program code, being arranged to cause the apparatus to at least perform at least one of the methods according to FIGS. 8, 10, 12, 14, 16, and 18 and related description.

Embodiments of the invention may be employed in a 3GPP network such as an LTE-A network. They may be employed also in other 3GPP and non-3GPP mobile networks such as CDMA, EDGE, LTE, UTRAN, WiFi, WLAN networks, etc.

A terminal may be a user equipment such as a mobile phone, a smart phone, a PDA, a laptop, a tablet PC, a wearable, a machine-to-machine device, or any other device which may be connected to the respective network such as a 3GPP network. If not otherwise indicated or made clear from the context, the terms "UE" and "user" are synonymously used in the present application.

One piece of information may be transmitted in one or plural messages from one entity to another entity. Each of these messages may comprise further (different) pieces of information.

Instead of the information described in the present application, complementary information may be provided. E.g., instead of the users to be provided with a service in IOPS mode of operation, the users not to be provided with the service in IOPS mode of operation may be indicated.

Names of network elements, protocols, and methods are based on current standards. In other versions or other technologies, the names of these network elements and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software.

According to the above description, it should thus be apparent that example embodiments of the present invention provide, for example a base station such as a NodeB or eNodeB, or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example a core network element such as a MME, or a component thereof, an apparatus embodying the same, a method for controlling and/or operating the same, and computer program(s) controlling and/or operating the same as well as mediums carrying such computer program (s) and forming computer program product(s). According to the above description, it should thus be apparent that example embodiments of the present invention provide, for example a terminal such as a UE, or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:
1. An apparatus, comprising:
providing means adapted to provide each of a first service and a second service to each of a first user and a second user;
mode monitoring means adapted to monitor if the providing means operates in an isolated mode or in a linked mode opposite to the isolated mode; and
a service control means and a user control means, wherein the service control means comprises
a service inhibiting means adapted to inhibit, if the providing means operates in the isolated mode, the providing means from providing the second service to at least one of the first user and the second user and providing the first service to at least one of the first user and the second user; and
a service maintaining means adapted to prevent the service inhibiting means from inhibiting the providing means from providing the first service to at least one of the first user and the second user; and the user control means comprises a user inhibiting means adapted to inhibit, if the providing means operates in the isolated mode, the providing means from providing the first service and the second service to the second user; and a user maintaining means adapted to prevent the user inhibiting means from inhibiting the providing means from providing at least one of the first service and the second service to the first user, wherein a notification that the isolated mode is in operation is broadcast to the first user and the second user in a serving area of a base station.

2. A method, comprising:

providing each of a first service and a second service to each of a first user and a second user by a providing unit;

monitoring if the providing unit operates in an isolated mode or in a linked mode opposite to the isolated mode; and a service controlling and a user controlling, wherein the service controlling comprises inhibiting, if the providing unit operates in the isolated mode, the providing unit from providing the second service to at least one of the first user and the second user and providing the first service to at least one of the first user and the second user; and preventing that the providing unit is inhibited from providing the first service to at least one of the first user and the second user; and the user controlling comprises inhibiting, if the providing unit operates in the isolated mode, the providing unit from providing the first service and the second service to the second user; and preventing that the providing unit is inhibited from providing at least one of the first service and the second service to the first user, wherein a notification that the isolated mode is in operation is broadcast to the first user and the second user in a serving area of a base station.

3. The method according to claim 2, further comprising:

monitoring if a link from the providing unit to a core network is available with at least a predefined quality;

setting the providing unit in the isolated mode if the link is not available with at least the predefined quality.

4. The method according to claim 3, wherein the link monitoring comprises continuously monitoring if the link is available with at least the predefined quality; and the method may further comprise setting the providing unit in the linked mode if the link is available with at least the predefined quality.

5. The method according to claim 4, further comprising:

providing the first service to the first user without interruption if the providing unit from the isolated mode into the linked mode.

6. The method according to claim 2, further comprising:

informing at least one of a base station device different from an apparatus performing the method, a third user, and a mobile edge computing device that the providing unit operates in the isolated mode and/or that the providing unit operates in the linked mode.

7. The method according to claim 6, wherein the third user is informed by broadcasting an isolated mode notification.

8. The method according to claim 2, wherein the first service is at least one of a group communication service and a proximity service.

9. The method according to claim 2 comprising the service controlling and further comprising:

determining the first service based on a received service determination message.

10. The method according to claim 9, further comprising:

monitoring if one of the first user and the second user is handed over to a first base station device different from an apparatus performing the method;

forwarding a service indication based on the service determination message to the first base station device.

11. The method according to claim 2 comprising the user controlling and further comprising:

determining the first user based on a received user determination message.

12. The method according to claim 11, further comprising:

monitoring if one of the first user and the second user is handed over to a second base station device different from an apparatus performing the method;

forwarding a user indication based on the user determination message to the second base station device.

13. The method according to claim 2 performed in a base station apparatus.

14. A non-transitory computer-readable medium comprising program instructions which when executed by a processor causes an apparatus to perform at least the following:

providing each of a first service and a second service to each of a first user and a second user by a providing unit;

monitoring if the providing unit operates in an isolated mode or in a linked mode opposite to the isolated mode; and a service controlling and a user controlling, wherein the service controlling comprises inhibiting, if the providing unit operates in the isolated mode, the providing unit from providing the second service to at least one of the first user and the second user and providing the first service to at least one of the first user and the second user; and preventing that the providing unit is inhibited from providing the first service to at least one of the first user and the second user; and the user controlling comprises inhibiting, if the providing unit operates in the isolated mode, the providing unit from providing the first service and the second service to the second user; and preventing that the providing unit is inhibited from providing at least one of the first service and the second service to the first user, wherein a notification that the isolated mode is in operation is broadcast to the first user and the second user in a serving area of a base station.

* * * * *